(12) United States Patent
Wang et al.

(10) Patent No.: US 12,500,834 B2
(45) Date of Patent: Dec. 16, 2025

(54) NETWORK CARD COMMUNICATION METHOD AND APPARATUS FOR AI TRAINING PLATFORM, DEVICE, AND MEDIUM

(71) Applicant: Suzhou Metabrain Intelligent Technology Co., Ltd., Suzhou (CN)

(72) Inventors: Wenxiao Wang, Suzhou (CN); Yingjie Kang, Suzhou (CN); Dekui Wang, Suzhou (CN); Pei Chen, Suzhou (CN)

(73) Assignee: Suzhou MetaBrain Intelligent Technology Co., Ltd., Suzhou (CN)

( * ) Notice: Subject to any disclaimer, the term of this patent is extended or adjusted under 35 U.S.C. 154(b) by 23 days.

(21) Appl. No.: 18/714,042

(22) PCT Filed: Jun. 30, 2022

(86) PCT No.: PCT/CN2022/102609
§ 371 (c)(1),
(2) Date: May 28, 2024

(87) PCT Pub. No.: WO2023/206799
PCT Pub. Date: Nov. 2, 2023

(65) Prior Publication Data
US 2025/0071047 A1    Feb. 27, 2025

(30) Foreign Application Priority Data

Apr. 30, 2022   (CN) .......................... 202210478751.9

(51) Int. Cl.
*H04L 47/32*  (2022.01)
*H04L 41/122*  (2022.01)
(Continued)

(52) U.S. Cl.
CPC ............ *H04L 45/14* (2013.01); *H04L 41/122* (2022.05)

(58) Field of Classification Search
CPC ....... H04L 45/14; H04L 41/122; H04L 47/32; H04L 45/74; G06F 11/14; G06F 11/07
(Continued)

(56) References Cited

U.S. PATENT DOCUMENTS

2018/0234330 A1    8/2018  Johnsen et al.
2019/0173840 A1    6/2019  Desai et al.
(Continued)

FOREIGN PATENT DOCUMENTS

CN    108965094 A    12/2018
CN    109981493 A    7/2019
(Continued)

OTHER PUBLICATIONS

International Search Report and Written Opinion of International Searching Authority of corresponding PCT application (PCT/CN2022/102609) Nov. 25, 2022 including English translation (15 pages).
(Continued)

*Primary Examiner* — Jude Jean Gilles
(74) *Attorney, Agent, or Firm* — Crowell & Moring LLP

(57) ABSTRACT

Disclosed are a network card communication method and apparatus for an AI training platform, a device, and a medium. The method includes: building a switch network topology on the basis of a spine-leaf network, and configuring a preset number of virtual local area networks for each leaf switch in the switch network topology; virtualizing a physical network card to obtain virtual network cards, allocating the virtual network cards to corresponding job-containers according to a preset allocation rule, and allocating, to each virtual network card in the job-containers, different sub-networks corresponding to the virtual local area networks; and adding a corresponding sub-network communication policy routing rule to a pod where each job-container is located, whereby a virtual network card in
(Continued)

the job-container sends training data to the remaining virtual network cards on a basis of the sub-network communication policy routing rule.

20 Claims, 7 Drawing Sheets

(51) Int. Cl.
*H04L 45/00* (2022.01)
*G06F 11/14* (2006.01)

(58) Field of Classification Search
USPC .......................................................... 709/242
See application file for complete search history.

(56) References Cited

U.S. PATENT DOCUMENTS

| | | | |
|---|---|---|---|
| 2022/0012129 A1* | 1/2022 | Doshi | G06F 11/0772 |
| 2022/0067687 A1* | 3/2022 | Hay | G06N 20/00 |

FOREIGN PATENT DOCUMENTS

| | | |
|---|---|---|
| CN | 111885075 A | 11/2020 |
| CN | 114157455 A | 3/2022 |
| CN | 114172905 A | 3/2022 |
| CN | 114584504 A | 6/2022 |

OTHER PUBLICATIONS

Search report of corresponding CN priority application (202210478751.9) Jun. 6, 2022 (2 pages).

Supplementary search report of corresponding CN priority application (CN202210478751 9) Jun. 21, 2022 (2 pages).

First Office Action of corresponding CN priority application (202210478751.9) Jun. 10, 2022 including English translation (13 pages).

Notification to Grant Patent Right for Invention of corresponding CN priority application (CN202210478751.9) Jun. 23, 2022 including English translation (2 pages).

Ray, "Docker Container Cross Host Multi Segment Communication Solution", «https://blog.csdn.net/lvjianzhaoa/article/details/102917558» , Oct. 21, 2019, Full text with English translation (10 pages).

Unknown person, "[Docker] Access between containers in different networks", «https://www.codenong.com/cs106954102/» , Jun. 25, 2020, Full text with English translation (5 pages).

* cited by examiner

NETWORK CARD COMMUNICATION METHOD AND APPARATUS FOR AI TRAINING PLATFORM, DEVICE, AND MEDIUM

CROSS-REFERENCE TO RELATED APPLICATION

This application is the national phase application of International Patent Application No. PCT/CN2022/102609, filed Jun. 30, 2022, which claims priority to Chinese Patent Application No. 202210478751.9, filed on Apr. 30, 2022 in China National Intellectual Property Administration and entitled "Network Card Communication Method and Apparatus for AI Training Platform, Device, and Medium". The contents of International Patent Application No. PCT/CN2022/102609 and Chinese Patent Application No. 202210478751.9 are each incorporated by reference herein in their entireties.

FIELD

The present application relates to a technical field of artificial intelligence, in particular to a network card communication method and apparatus for an AI training platform, a device, and a medium.

BACKGROUND

In AI (Artificial Intelligence) training scenarios, a large amount of data is transmitted. However, due to limitations of network data packet receiving and transmitting mechanisms for conventional operating systems, requirements of training tasks for downloading a large number of data sets and transmitting an enormous quantity of training parameters may not be met. Therefore, a large number of AI training platforms are gradually beginning to support high-performance networks, such as Infiniband (wireless broadband technology) and ROCE (a Remote Direct Memory Access (RDMA) over Converged Ethernet, a network protocol that allows using the RDMA through Ethernet).

When an AI server has a plurality of GPU (Graphic Processing Unit) cards, in order to achieve optimal training results, sometimes a single AI server is equipped with 2, 4, or 8 ROCE network cards or Infiniband network cards. The Infiniband network cards may be connected to a two-layer network within a scale of 48000 nodes. However, for the ROCE network cards, in order to avoid broadcast storms or comply with unified network management in a computer room, a plurality of ROCE network cards on a single host are divided into different sub-networks. When all GPU cards in a plurality of hosts are used for task training tasks, NCCL_CROSS_NIC=0 may be set through the characteristics of NCCL (abbreviation of Nvidia Collective multi-GPU Communication Library, a library used for implementing collective communication (all-gather, reduce, broadcast) among a plurality of GPUs) to avoid the requirement of GPU cards for cross sub-network communication.

However, the inventor realizes that, for an AI training platform built on a basis of containers, some GPU cards in a plurality of hosts may be allocated to the containers, and the GPU cards may communicate on a basis of ROCE network cards of the same sub-network or ROCE network cards of different sub-networks. When cross sub-network communication is required, because the different sub-networks may not communicate directly, the operation of a training task may fail. As shown in FIG. 1, because two ROCE network cards belong to different sub-networks, data transmission may not be performed. In FIG. 1, PCIE refers to PCI-Express (peripheral component interconnect express), which is a high-speed serial computer extension bus standard; and Vlan refers to Virtual Local Area Network.

SUMMARY

In a first aspect, the present application discloses a network card communication method for an AI training platform, including:
building a switch network topology on a basis of a spine-leaf network, and configuring a preset number of virtual local area networks for each leaf switch in the switch network topology;
virtualizing a physical network card to obtain a plurality of virtual network cards, allocating the virtual network cards to corresponding job-containers according to a preset allocation rule, and allocating, to each virtual network card in the job-containers, different sub-networks corresponding to the virtual local area networks; and
adding a corresponding sub-network communication policy routing rule to a pod where each job-container is located, whereby the virtual network card in the job-container sends training data to a remaining virtual network cards on a basis of the sub-network communication policy routing rule.

In one embodiment, the network card communication method for the AI training platform further includes:
determining a preset convergence ratio for the leaf switch, determining a quantity of spine switches on a basis of the preset convergence ratio, and then establishing a connection between each leaf switch and each spine switch and between each leaf switch and each virtual network card respectively.

In one embodiment, the adding a corresponding sub-network communication policy routing rule to a pod where each job-container is located, whereby the virtual network card in the job-container sends training data to the remaining virtual network cards on the basis of the sub-network communication policy routing rule includes:
obtaining pre-created sub-network communication policy routing rules corresponding to different pods; and
adding the corresponding sub-network communication policy routing rule to the pod where each job-container is located, whereby a source Internet Protocol (IP) address and a destination IP address of training data are obtained on the basis of the sub-network communication policy routing rule, sending the training data to a destination sub-network gateway corresponding to the source IP address through the virtual network card corresponding to the source IP address, and then sending the training data to the virtual network card corresponding to the destination IP address through the destination sub-network gateway.

In one embodiment, before obtaining pre-created sub-network communication policy routing rules corresponding to different pods, the method further includes:
building pods on a basis of the job-containers, init-containers, and pause-containers; and
correspondingly, the adding the corresponding sub-network communication policy routing rule to the pod where each job-container is located includes:
adding the corresponding sub-network communication policy routing rule to the init-container in each pod.

In one embodiment, after adding the corresponding sub-network communication policy routing rule to the init-container in each pod, the method further includes:

determining a sub-network gateway pre-allocated to the virtual network cards corresponding to each pod; and sending a ping command to the sub-network gateway through each pod, and sending, on a basis of the ping command, an address resolution protocol request including a physical address of the pod to the corresponding leaf switch, whereby the leaf switch obtains an IP address of the pod, and the spine switch learns the IP address from the leaf switch on a basis of a border gateway protocol.

In one embodiment, the allocating the virtual network cards to corresponding job-containers according to a preset allocation rule, and allocating, to each virtual network card in the job-containers, different sub-networks corresponding to the virtual local area networks includes:

allocating the virtual network cards to the corresponding job-containers on the basis of an IP address management component, and allocating, to each virtual network card in the job-containers, different sub-network IP addresses and corresponding sub-network gateways corresponding to the virtual local area networks on the basis of the IP address management component.

In one embodiment, the network card communication method for the AI training platform further includes:

in response to adding a preset number of leaf switches in the switch network topology, adding sub-network communication policy routing rules corresponding to the preset number of leaf switches to existing pods, creating new pods corresponding to the preset number of leaf switches, and then adding the corresponding sub-network communication policy routing rules to the new pods.

In a second aspect, the present application discloses a network card communication apparatus for an AI training platform, including:

a configuration module, configured to build a switch network topology on a basis of a spine-leaf network, and configure a preset number of virtual local area networks for each leaf switch in the switch network topology;

an allocation module, configured to virtualize a physical network card to obtain a plurality of virtual network cards, allocate the virtual network cards to corresponding job-containers according to a preset allocation rule, and allocate, to each virtual network card in the job-containers, different sub-networks corresponding to the virtual local area networks; and a communication module, configured to add a corresponding sub-network communication policy routing rule to a pod where each job-container is located, whereby a virtual network card in the job-container sends training data to the remaining virtual network cards on a basis of the sub-network communication policy routing rule.

In a third aspect, the present application discloses an electronic device, including:

a memory, configured to store computer-readable instructions; and one or more processors, configured to execute the computer-readable instructions to implement the steps of the network card communication method for the AI training platform disclosed in any of the foregoing embodiments.

In a fourth aspect, the present application discloses a non-transitory computer-readable storage medium for storing computer-readable instructions, where the computer-readable instructions, when executed by one or more processors, implement the steps of the network card communication method for the AI training platform disclosed in any of the foregoing embodiments.

Details of one or more embodiments of the present application are provided in accompanying drawings and descriptions below. Other features and advantages of the present application will become apparent from the description, accompanying drawings and claims.

BRIEF DESCRIPTION OF THE DRAWINGS

In order to describe the embodiments of the present application or the technical solutions in the existing art more clearly, drawings required to be used in the illustration of the embodiments or the existing art will be briefly introduced below. Apparently, the drawings in the illustration below show the embodiments of the present application. Those ordinarily skilled in the art also may obtain other drawings according to the provided drawings without creative work.

DETAILED DESCRIPTION

The technical solutions in the embodiments of the present application will be clearly and completely described below with reference to the accompanying drawings in the embodiments of the present application. Obviously, the described embodiments are some of the embodiments of the present application, rather than all the embodiments. Based on the embodiments of the present application, all other embodiments obtained by those skilled in the art without creative work shall fall within the protection scope of the present application.

Currently, in an AI training scenario, when a ROCE network card requires cross sub-network communication, because different sub-networks may not communicate directly, an operation of a training task may fail. Therefore, the embodiments of the present application disclose a network card communication method and apparatus for an AI training platform, a device, and a medium, which may implement communication between different network cards in the AI training platform.

Figure 1:
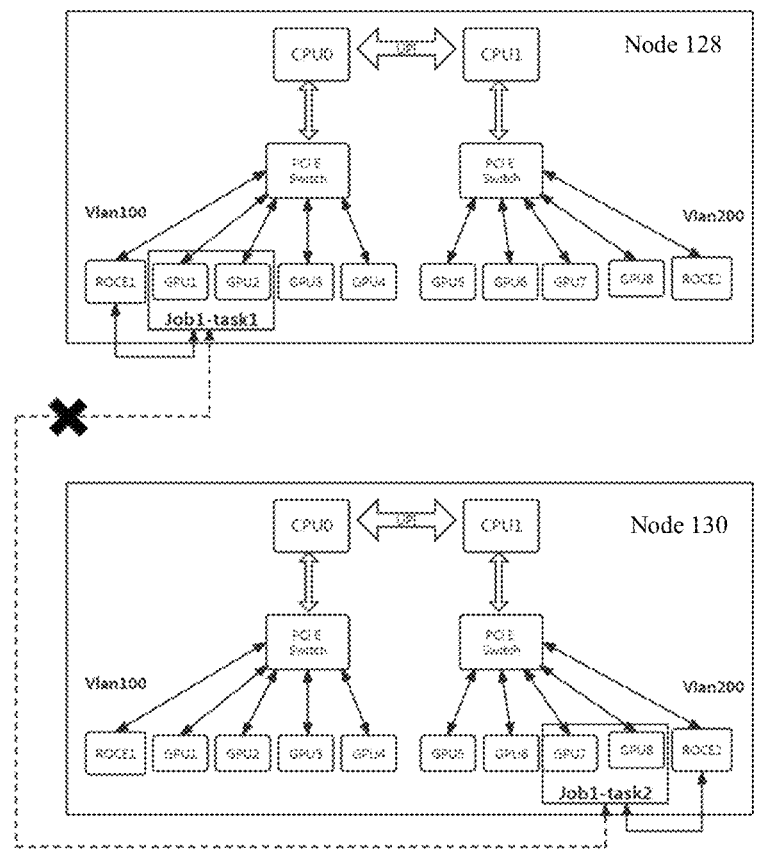
FIG. 1 is a schematic diagram showing that virtual network cards of different sub-networks may not communicate in one or more embodiments of the present application.
Figure 2:
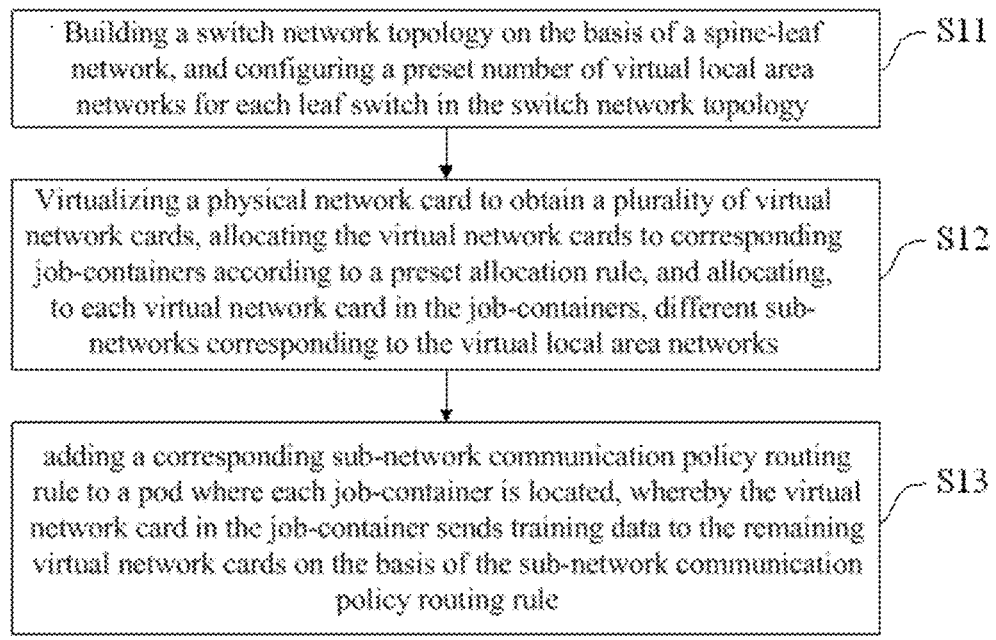
FIG. 2 is a flowchart of a network card communication method for an AI training platform in one or more embodiments of the present application.

As shown in FIG. 2, an embodiment of the present application discloses a network card communication method for an AI training platform. The method includes:

Step S11: building a switch network topology on a basis of a spine-leaf network, and configuring a preset number of virtual local area networks for each leaf switch in the switch network topology.

Figure 3:
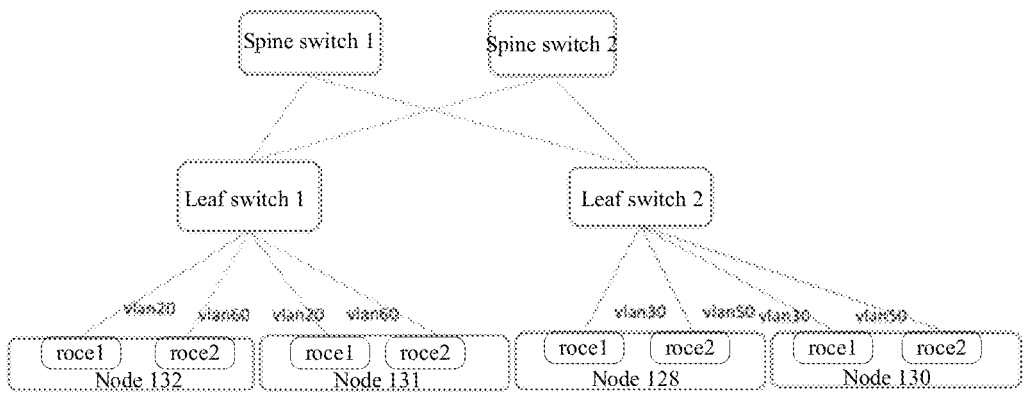
FIG. 3 is a switch network topology diagram in one or more embodiments of the present application.

The switch network topology in this embodiment is built on the basis of a spine-leaf network, and the preset number of the virtual local area networks (Vlans) are configured for each leaf switch in the switch network topology. As shown in FIG. 3, there are two leaf switches, denoted as leaf switch 1 (leaf 1) and leaf switch 2 (leaf 2), and each leaf switch is configured with two different virtual local area networks, where the two virtual local area networks of leaf switch 1 are respectively vlan20 and vlan60, and the two virtual local area networks of leaf switch 2 are respectively vlan30 and vlan50. It should be pointed out that the AI training platform in this embodiment is built on a basis of Kubernetes. Kubernetes is an open-source container arrangement project used for managing containerized applications on a plurality of hosts in a cloud platform. Kubernetes aims to make deploying containerized applications simple and efficient.

Step S12: virtualizing a physical network card to obtain a plurality of virtual network cards, allocating the virtual network cards to corresponding job-containers according to a preset allocation rule, and allocating, to each virtual network card in the job-containers, different sub-networks corresponding to the virtual local area networks.

The network card used in this embodiment is a ROCE network card, which supports a ROCE protocol. In addition, when the physical network card is virtualized, the AI training platform virtualizes the physical ROCE network card on a basis of SRIOV (Single Root Input/Output Virtualization) technology to obtain a plurality of virtual network cards, and reports information of the virtual network cards to Kubernetes. Then, the AI training platform allocates resources to the virtual network cards, that is, allocates the virtual network cards to corresponding job-containers according to the preset allocation rule, and allocates, to each virtual network card in the job-containers, different sub-networks corresponding to the virtual local area networks. For example, if there are two virtual network cards in a job-container, the two virtual network cards belong to different sub-networks. As shown in FIG. 3, the job-container running in node 132 has two virtual network cards, denoted as roce1 and roce2. The sub-network allocated to roce1 corresponds to vlan20, and the sub-network allocated to roce2 corresponds to vlan60.

In this embodiment, the network card communication method for the AI training platform further includes: determining a preset convergence ratio for the leaf switch, determining a quantity of spine switches on a basis of the preset convergence ratio, and then establishing a connection between each leaf switch and each spine switch and a connection between each leaf switch and each virtual network card respectively. It may be understood that the preset convergence ratio needs to be configured for the leaf switch. The preset convergence ratio refers to a ratio of downlink traffic to uplink traffic of the switch. It may be determined according to the convergence ratio that how many ports the leaf switch needs to connect to spine switches, and a quantity of uplink ports of the leaf switch determines a quantity of spine switches. Similarly, a quantity of downlink ports of a spine switch determines a quantity of leaf switches. Therefore, the quantity of spine switches may be determined by a value of the convergence ratio. In this embodiment, it is assumed that the quantity of leaf switches is known.

Then the connection between each leaf switch and each spine switch and the connection between each leaf switch and each virtual network card are established respectively, as shown in FIG. 3. In this embodiment, in order to ensure that the training task is not constrained by communication bandwidth, the convergence ratio for the leaf switch is configured to be 1:1, which is beneficial to GPU card management according to principle of optimal allocation of GPUs for AI training without considering constraints on network communication during GPU resource allocation on the basis of the AI training platform.

Step S13: adding a corresponding sub-network communication policy routing rule to a pod where each job-container is located, whereby a virtual network card in the job-container sends training data to remaining virtual network cards on a basis of the sub-network communication policy routing rule.

Figure 4:
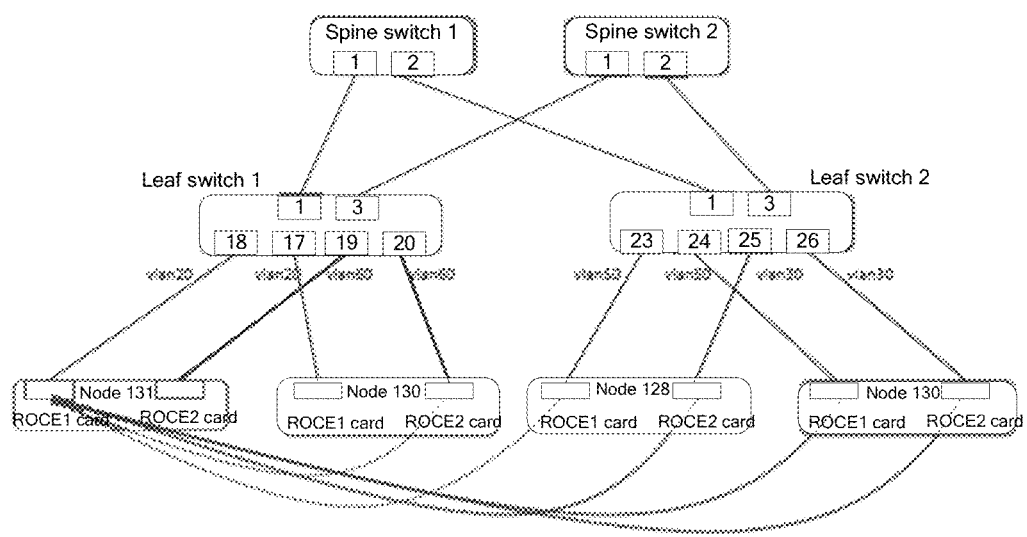
FIG. 4 is a schematic diagram of communication between virtual network cards in one or more embodiments of the present application.

In this embodiment, a corresponding sub-network communication policy routing rule is added to a pod where each job-container is located, whereby the virtual network card in the job-container sends training data to the remaining virtual network cards on the basis of the sub-network communication policy routing rule, to implement communication between any virtual network cards. That is, for pods of a host that run in different leaf switches, different policy routes are injected respectively. Cross sub-network communication traffic is forwarded by a gateway of the spin-leaf switches on the basis of the policy routes and using the cross sub-network routing capability of physical switches, thereby achieving an effect that any virtual network card may communicate, meeting a requirement of distributed training tasks for using any ROCE network card, and avoiding a problem of RDMA (Remote Direct Memory Access) communication timeout failure of the training tasks when the training tasks use ROCE network cards belonging to different sub-networks. It should be pointed out that the ROCE network cards implement RDMA communication on a basis of UDP (User Datagram Protocol). As shown in FIG. 4, ROCE1 network card in node 131 may communicate with any other network card.

In the present application, a switch network topology is built on the basis of a spine-leaf network, and a preset number of virtual local area networks is configured for each leaf switch in the switch network topology; a physical network card is virtualized to obtain a plurality of virtual network cards, the virtual network cards are allocated to corresponding job-containers according to a preset allocation rule, and different sub-networks corresponding to the virtual local area networks are allocated to each virtual network card in the job-containers; and a corresponding sub-network communication policy routing rule is added to a pod where each job-container is located, whereby the virtual network card in the job-container sends training data to the remaining virtual network cards on the basis of the sub-network communication policy routing rule. Therefore, the switch network topology in the present application is built on the basis of a spine-leaf network, and a preset number of virtual local area networks need to be configured for each leaf switch in the switch network topology. In addition, the physical network card needs to be virtualized to obtain a plurality of virtual network cards, the virtual network cards are allocated to the job-containers, and a sub-network communication policy routing rule needs to be added to the pod where each job-container is located, whereby the virtual network card in the job-container sends training data to the remaining virtual network cards on the basis of the sub-network communication policy routing rule, that is, communication between different virtual network cards is implemented.

Figure 5:
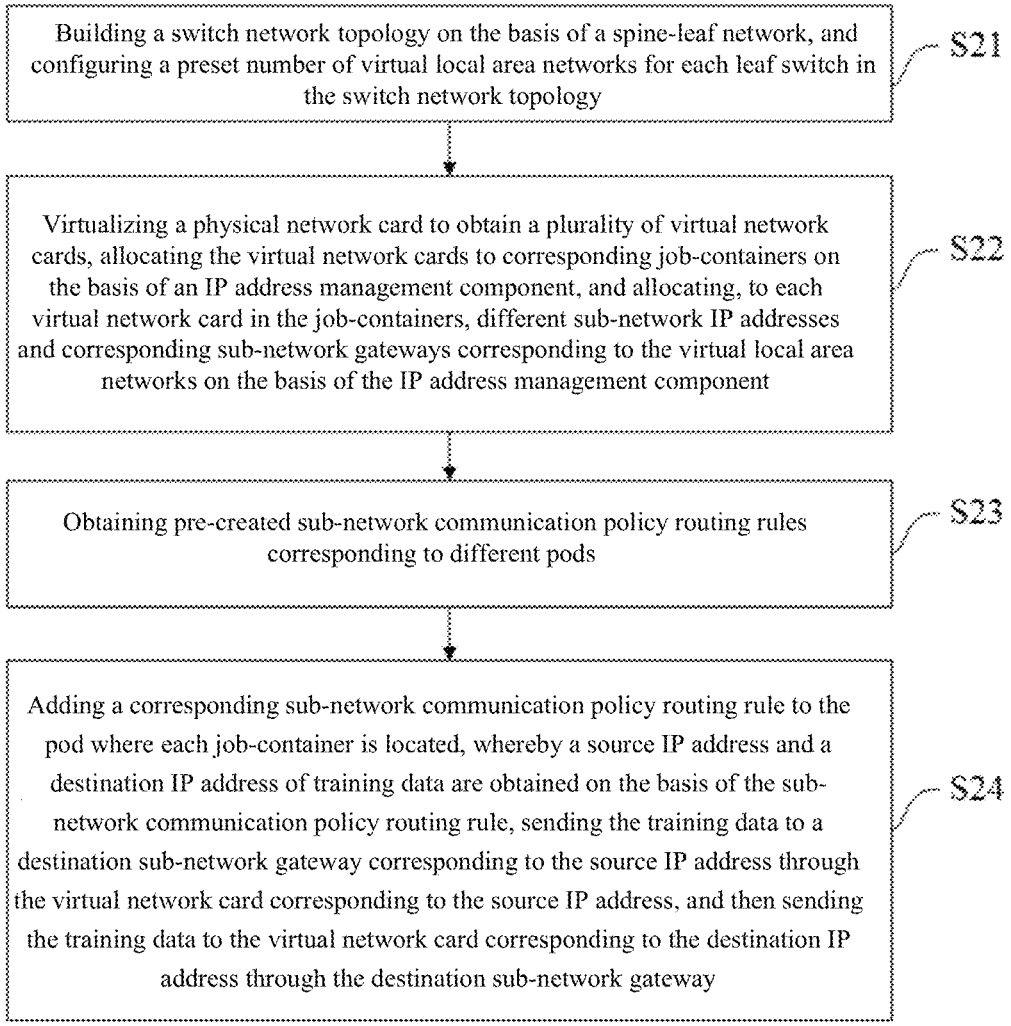
FIG. 5 is a flowchart of the network card communication method for the AI training platform in one or more embodiments of the present application.

As shown in FIG. 5, an embodiment of the present application discloses the network card communication method for the AI training platform. Compared to previous embodiments, this embodiment further explains and optimizes a technical solution. The method includes:

Step S21: building a switch network topology on the basis of a spine-leaf network, and configuring a preset number of virtual local area networks for each leaf switch in the switch network topology.

Step S22: virtualizing a physical network card to obtain a plurality of virtual network cards, allocating the virtual network cards to corresponding job-containers on a basis of an IP address management component, and allocating, to each virtual network card in the job-containers, different sub-network IP addresses and corresponding sub-network gateways corresponding to the virtual local area networks on the basis of the IP address management component.

In this embodiment, the plurality of virtual network cards is allocated to job-containers used for training tasks on a basis of a self-developed component, where the self-developed component may be an IPAM (IP Address Management) component. Moreover, IP addresses of switches that belong to different sub-networks and corresponding sub-network gateways are allocated to each virtual network card in the job-containers on the basis of the IPAM component. When the IP addresses are allocated, idle and unused IP addresses may be selected within Vlan sub-networks of the physical network card where the virtual network cards are located. By using the sub-networks defined by the switches, the IP addresses are allocated from the sub-networks and sub-network gateways are configured to the containers, thereby implementing cross sub-network RDMA communication on a basis of three-layer routing capability of the switches.

Step S23: obtaining pre-created sub-network communication policy routing rules corresponding to different pods.

Figure 6:
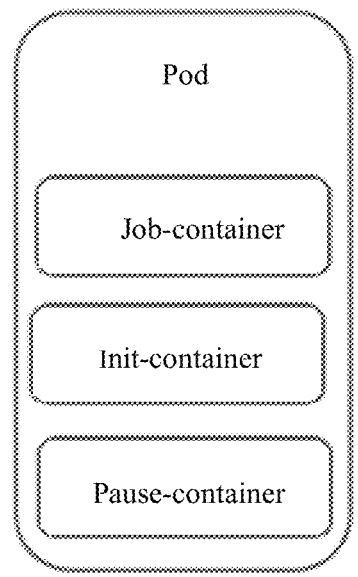
FIG. 6 is a schematic diagram of composition of a pod in one or more embodiments of the present application.

In this embodiment, pre-created sub-network communication policy routing rules corresponding to different pods need to be obtained. Moreover, before obtaining pre-created sub-network communication policy routing rules corresponding to different pods, the method further includes: building pods on a basis of job-containers, init-containers, and pause-containers. It may be understood that, when pods used for training tasks are created, before job-containers used for training tasks are started, init-containers need to be added to the pods for injecting sub-network communication policy routing rules. In addition, each pod has a pause-container, the pause-container builds characteristics of a network environment for the pod, and the container is first started in each pod to prepare network space and storage space for all containers in the pod. That is, as shown in FIG. 6, each pod in this embodiment may include three containers: a job-container, an init-container, and a pause-container.

Step S24: adding a corresponding sub-network communication policy routing rule to the pod where each job-container is located, whereby a source IP address and a destination IP address of training data are obtained on the basis of the sub-network communication policy routing rule, sending the training data to a destination sub-network gateway corresponding to the source IP address through the virtual network card corresponding to the source IP address, and then sending the training data to the virtual network card corresponding to the destination IP address through the destination sub-network gateway.

In this embodiment, the adding a corresponding sub-network communication policy routing rule to the pod where each job-container is located may include: adding the corresponding sub-network communication policy routing rule to an init-container in each pod. That is, the sub-network communication policy routing rule is added to the init-container of the pod. The sub-network communication policy routing rule is to obtain a source IP address (Internet Protocol Address) and a destination IP address of training data, the training data is sent to a destination sub-network gateway corresponding to the source IP address through the virtual network card corresponding to the source IP address, and then the training data is sent to the virtual network card corresponding to the destination IP address through the destination sub-network gateway, so as to implement communication between any network cards. That is, data packets are filtered on a basis of source IP addresses and destination IP addresses of the data packets, and the data packets are sent to different sub-network gateways to implement cross sub-network communication. For example, roce1 card of node 132 accesses roce cards of any other nodes in FIG. 3. It is assumed that the gateway corresponding to vlan20 is 192.168.10.254; the gateway corresponding to vlan60 is 192.168.20.254; the gateway corresponding to vlan30 is 192.168.30.254; and the gateway corresponding to vlan50 is 192.168.40.254. The sub-network communication policy routing rule that needs to be injected for roce1 is:

ip route add 192.168.10.0/24 via 192.168.20.254 table 1; that is, data packets in view of a destination sub-network 192.168.10.0/24 need to pass through gateway 192.168.20.254;

ip rule add from 192.168.20.0/24 to 192.168.10.0/24 table 1 prio 221; that is, training data packets in view of a source IP address 192.168.20.0/24 and a destination IP address 192.168.10.0/24 are processed by routing table 1, and the data packets are sent to the gateway 192.168.20.254;

Similarly, the other policy routing rules of the pod where roce1 is located are obtained as follows:

ip route add 192.168.20.0/24 via 192.168.10.254 table 2;
ip route add 192.168.30.0/24 via 192.168.20.254 table 3;
ip route add 192.168.40.0/24 via 192.168.10.254 table 4;
ip route add 192.168.30.0/24 via 192.168.10.254 table 5;
ip route add 192.168.40.0/24 via 192.168.20.254 table 6;
ip rule add from 192.168.10.0/24 to 192.168.20.0/24 table 2 prio 222;
ip rule add from 192.168.20.0/24 to 192.168.30.0/24 table 3 prio 223;
ip rule add from 192.168.20.0/24 to 192.168.40.0/24 table 6 prio 224;
ip rule add from 192.168.10.0/24 to 192.168.30.0/24 table 5 prio 225;
ip rule add from 192.168.10.0/24 to 192.168.40.0/24 table 4 prio 226.

In this embodiment, after adding the corresponding sub-network communication policy routing rule to an init-container in each pod, the method further includes: determining a sub-network gateway pre-allocated to the virtual network cards corresponding to each pod; and sending a ping command to the sub-network gateway through each pod, and sending, on a basis of the ping command, an address resolution protocol request including a physical address of the pod to the corresponding leaf switch, whereby the leaf switch obtains an IP address of the pod, and the spine switch learns the IP address from the leaf switch on the a of a border gateway protocol. It may be understood that the ROCE switch learns routing information on a basis of a BGP (Border Gateway Protocol) protocol. Compared to the startup speed and process of a physical machine and a virtual machine, startup time of a container is shorter and the container does not actively send an ARP (Address Resolution Protocol) request to the switch. After the container is started, the switch does not have an MAC (Media Access Control Address, namely physical address) address and IP relationship table of the container. As a result, the switch may not learn cross sub-network routing in a timely manner. In this case, if the training task is run, communication failure may occasionally occur. Therefore, after the sub-network communication policy routing rule is added to the pod, a ping command needs to be sent to the corresponding sub-network gateway through each pod, so as to send an address resolution protocol request including a physical address of the pod to the corresponding leaf switch, whereby the leaf switch obtains an IP address of the pod, and the spine switch learns IP address information of the pod from the leaf switch on the basis of a border gateway protocol. That is, by simulating the communication mechanism of a physical machine systemctl restart network, a connection may be quickly established with the leaf switch to ensure that correct cross sub-network communication routes may be learned in a timely manner on the spine-leaf switch, whereby when the training task is started, the switch network has completed preparation work for cross sub-network communication. When the pod reports its physical address to the leaf switch, the pod needs to sleep for a period of time for the switch to learn routing. The corresponding operation is as follows:

ping 192.168.10.254-c 10;
    ping 192.168.20.254-c 10;
    sleep 120s.

In this embodiment, the network card communication method for the AI training platform further includes: in response to adding a preset number of leaf switches in the switch network topology, adding sub-network communication policy routing rules corresponding to the preset number of leaf switches to existing pods, creating new pods corresponding to the preset number of leaf switches, and then adding the corresponding sub-network communication policy routing rules to the new pods. It may be understood that, for large-scale cluster scenarios, more leaf switches need to be horizontally expanded. In this case, policy routes need to be refreshed for all host containers in the cluster, and an automated tool for automatically generating policy routes needs to be defined for cluster operation and maintenance. It is assumed that existing leaf switch sub-networks and corresponding gateway information in the cluster are (neti1, gatewayi1) and (neti2, gatewayi2), where i represents a serial number of the leaf switch, each leaf switch has two sub-networks, and i1 and i2 represent two sub-networks numbered i in the leaf switch. When a new leaf switch is added, information of two sub-networks of the added leaf switch is defined as neta and netb, and gateways are defined as gatewaya and gatewayb. For the i-th existing leaf switch, the host container in the switch needs to be added with the following policy rules:

ip route add $net_a$ via $gateway_{i2}$ table (k+1)*2+1
    ip route add $net_b$ via $gateway_{i1}$ table (k+1)*2+2
    ip route add $net_a$ via $gateway_{i1}$ table (k+1)*2+3
    ip route add $net_b$ via $gateway_{i2}$ table (k+1)*2+4
    ip rule add from $net_{i2}$ to $net_a$ table (k+1)*2+1 prio 220+(k+1)*2+1
    ip rule add from $net_{i2}$ to $net_b$ table (k+1)*2+4 prio 220+(k+1)*2+2
    ip rule add from $net_{i1}$ to $net_a$ table (k+1)*2+3 prio 220+(k+1)*2+3
    ip rule add from $net_{i1}$ to $net_b$ table (k+1)*2+2 prio 220+(k+1)*2+4

For the added leaf switch, cross sub-network policy routes need to be defined in the host container of the leaf switch, as shown below:

ip route add $net_a$ via $gateway_b$ table 1
    ip route add $net_b$ via $gateway_b$ table 2
    ip route add $net_{i1}$ via $gateway_b$ table 3
    ip route add $net_{i2}$ via $gateway_b$ table 4
    ip route add $net_{i1}$ via $gateway_a$ table 5
    ip route add $net_{i2}$ via $gateway_b$ table 6
    ip rule add from $net_b$ to $net_a$ table 1 prio 221
    ip rule add from $net_a$ to $net_b$ table 2 prio 222
    ip rule add from $net_b$ to $net_{i1}$ table 3 prio 223
    ip rule add from $net_b$ to $net_{i2}$ table 6 prio 224
    ip rule add from $net_a$ to $net_{i1}$ table 5 prio 225
    ip rule add from $net_a$ to $net_{i2}$ table 4 prio 226

The more processing process of step S21 may refer to the corresponding content disclosed in the foregoing embodiment, and will not be further repeated here.

In the embodiment of the present application, pre-created sub-network communication policy routing rules corresponding to different pods need to be obtained; and the corresponding sub-network communication policy routing rule is added to the pod where each job-container is located, whereby a source IP address and a destination IP address of training data are obtained on the basis of the sub-network communication policy routing rule, the training data is sent to a destination sub-network gateway corresponding to the source IP address through the virtual network card corresponding to the source IP address, and then the training data is sent to the virtual network card corresponding to the destination IP address through the destination sub-network gateway, so as to implement communication between any network cards. Moreover, the pod in the embodiment of the present application is on the basis of a job-container, an init-container, and a pause-container, and the corresponding sub-network communication policy routing rule is added to the init-container in the pod. In addition, after adding the corresponding sub-network communication policy routing rule to an init-container in each pod, the method further includes: determining a sub-network gateway pre-allocated to the virtual network cards corresponding to each pod; and sending a ping command to the sub-network gateway through each pod, and sending, on the basis of the ping command, an address resolution protocol request including a physical address of the pod to the corresponding leaf switch, whereby the leaf switch obtains an IP address of the pod, and the spine switch learns the IP address from the leaf switch on the basis of a border gateway protocol. In this way, it may be ensured that correct cross sub-network communication routes may be learned in a timely manner on the spine-leaf switch, whereby when the training task is started, the switch network has completed preparation work for cross sub-network communication. When a new leaf switch is added to the switch network topology, corresponding sub-network communication policy routing rules are added to all pods using a tool for automatically generating policy routes.

Figure 7:
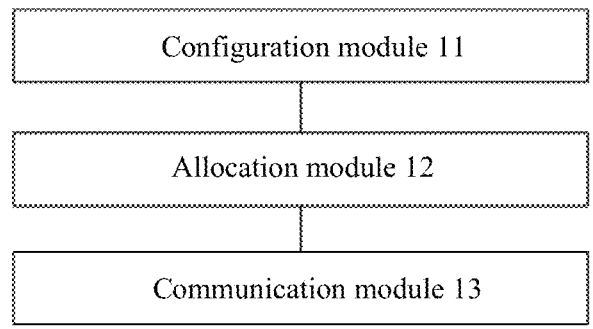
FIG. 7 is a schematic structural diagram of a network card communication apparatus for an AI training platform in one or more embodiments of the present application.

As shown in FIG. 7, an embodiment of the present application discloses a network card communication apparatus for an AI training platform. The apparatus includes:

a configuration module 11, configured to build a switch network topology on the basis of a spine-leaf network, and configure a preset number of virtual local area networks for each leaf switch in the switch network topology;

an allocation module 12, configured to virtualize a physical network card to obtain a plurality of virtual network cards, allocate the virtual network cards to corresponding job-containers according to a preset allocation rule, and allocate, to each virtual network card in the job-containers, different sub-networks corresponding to the virtual local area networks; and a communication module 13, configured to add a corresponding sub-network communication policy routing rule to a pod where each job-container is located, whereby the virtual network card in the job-container sends training data to the remaining virtual network cards on the basis of the sub-network communication policy routing rule.

In the present application, a switch network topology is built on the basis of a spine-leaf network, and a preset number of virtual local area networks is configured for each leaf switch in the switch network topology; a physical network card is virtualized to obtain a plurality of virtual network cards, the virtual network cards are allocated to corresponding job-containers according to a preset allocation rule, and different sub-networks corresponding to the virtual local area networks are allocated to each virtual network card in the job-containers; and a corresponding sub-network communication policy routing rule is added to a pod where each job-container is located, whereby the virtual network card in the job-container sends training data to the remaining virtual network cards on the basis of the sub-network communication policy routing rule. Therefore, the switch network topology in the present application is built on the basis of a spine-leaf network, and a preset number of virtual local area networks need to be configured for each leaf switch in the switch network topology. In addition, the physical network card needs to be virtualized to obtain a plurality of virtual network cards, the virtual network cards are allocated to the job-containers, and a sub-network communication policy routing rule needs to be added to the pod where each job-container is located, whereby the virtual network card in the job-container sends training data to the remaining virtual network cards on the basis of the sub-network communication policy routing rule, that is, communication between different virtual network cards is implemented.

It should be noted that definitions on the network card communication apparatus for the AI training platform may refer to the previous definitions on the network card communication method for the AI training platform, and will not be repeated here. The modules in the network card communication apparatus for the AI training platform may be implemented entirely or partially through software, hardware, or a combination thereof. The foregoing modules may be embedded in or independent of a processor in a computer device in a form of hardware, or stored in a memory of a computer device in a form of software, whereby the processor calls the modules to perform operations corresponding to the modules.

Figure 8:
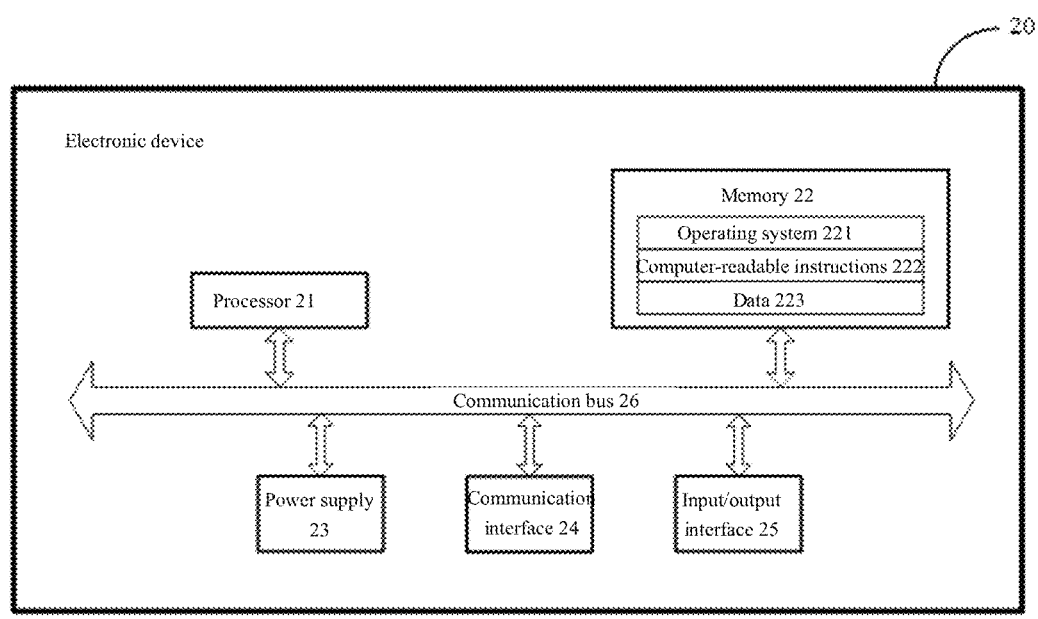
FIG. 8 is a structural diagram of an electronic device in one or more embodiments of the present application.

FIG. 8 is a schematic structural diagram of an electronic device provided in an embodiment of the present application. In some embodiments, the electronic device may include: at least one processor 21, at least one memory 22, a power supply 23, a communication interface 24, an input/output interface 25, and a communication bus 26. The memory 22 is configured to store computer-readable instructions, and the computer-readable instructions are loaded and executed by the processor 21 to implement the relevant steps in the network card communication method for an AI training platform disclosed in any of the foregoing embodiments and performed by the electronic device.

In this embodiment, the power supply 23 is configured to provide working voltage for various hardware devices in the electronic device 20; the communication interface 24 may create a data transmission channel between the electronic device 20 and an external device, following any communication protocol applicable to the technical solutions of the present application, which is not limited here; and the input/output interface 25 is configured to obtain external input data or output data to the outside, and its interface type may be selected according to application needs and is not limited here.

The processor 21 may include one or more processing cores, such as a 4-core processor or an 8-core processor. The processor 21 may be implemented in at least one hardware form of DSP (Digital Signal Processing), FPGA (Field-Programmable Gate Array), or PLA (Programmable Logic Array). The processor 21 may include a main processor and co-processors, where the main processor is a processor configured to process data in a wake-up state, and is also known as a CPU (Central Processing Unit); and the co-processors are low-power processors configured to process data in a standby state. In some embodiments, the processor 21 may be integrated with a GPU (Graphics Processing Unit) for rendering and drawing content that needs to be displayed on a display screen. In some embodiments, the processor 21 may further include an AI (Artificial Intelligence) processor for processing computational operations related to machine learning.

In addition, the memory 22, as a carrier for resource storage, may be a read-only memory, a random-access memory, a magnetic disk, an optical disk, etc. The resources stored in the memory include an operating system 221, computer-readable instructions 222, data 223, etc. The storage may be temporary storage or permanent storage.

The operating system 221 is configured to manage and control various hardware devices in the electronic device 20 and the computer-readable instructions 222, to implement operation and processing of massive data 223 in the memory 22 by the processor 21. The operating system may be Windows, Unix, Linux, etc. The computer-readable instructions 222 may further include computer-readable instructions that may be used for completing other work, in addition to computer-readable instructions that may be used for completing the network card communication method for an AI training platform disclosed in any of the foregoing embodiments and performed by the electronic device 20. The data 223 may include data received by the electronic device and transmitted from an external device, data collected by the input/output interface 25, etc.

Figure 9:
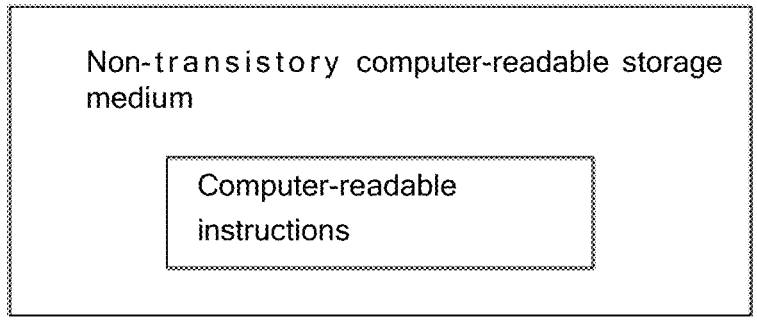
FIG. 9 is a schematic diagram of a non-transitory computer-readable storage medium in one or more embodiments of the present application.

Further, an embodiment of the present application discloses a non-transitory computer-readable storage medium, as shown in FIG. 9, storing computer-readable instructions. When the computer-readable instructions are loaded and executed by one or more processors, the method steps performed in the network card communication process for an AI training platform disclosed in any of the foregoing embodiments are implemented.

The embodiments in this specification are described in a progressive manner, each embodiment focuses on differences from other embodiments, and reference may be made to the same or similar parts of the embodiments. The apparatus disclosed in the embodiment corresponds to the method disclosed in the embodiment and is thus described relatively simply, and reference may be made to the description of the method for related parts.

Professionals may further realize that the units and algorithm steps of each example described in the embodiments disclosed herein may be implemented by electronic hardware, computer software, or a combination of the two. To clearly illustrate the interchangeability of hardware and software, the composition and steps of each example are described in general terms of functions in the above description. Whether the functions are performed in a hardware or software manner depends on particular applications and design constraint conditions of the technical solutions. A person skilled in the art may use different methods to implement the described functions for each particular application, but the implementation is not beyond the scope of the present application.

The steps of the methods or algorithms described in the embodiments disclosed herein may be directly implemented by hardware, a software module executed by a processor, or a combination thereof. The software module may reside in a random-access memory (RAM), a memory, a read-only memory (ROM), an electrically programmable ROM, an electrically erasable programmable ROM, a register, a hard disk, a removable disk, a CD-ROM, or any other form of storage medium known in the art.

Finally, it should be noted that in the specification, relational terms such as first and second are used to differentiate an entity or operation from another entity or operation, and do not necessarily require or imply that any actual relationship or sequence exists between these entities or operations. Moreover, the term "include", "comprise", or any variants thereof is intended to cover a non-exclusive inclusion, whereby a process, method, article, or device including a series of elements not only includes the elements, but further includes other elements not listed explicitly, or includes inherent elements of the process, method, article, or device. In the absence of more limitations, an element defined by "include a . . . " does not exclude other same elements existing in the process, method, article, or device including the element.

The above details a network card communication method and apparatus for an AI training platform, a device, and a medium provided in the present application. The principles and implementations of the present application are elaborated herein through examples. The descriptions of the above embodiments are merely used to help understand the methods and core ideas of the present application. In addition, those of ordinary skill in the art may make changes in terms of implementations and application scope according to the ideas of the present application. Therefore, the content of this specification shall not be construed as limitations to the present application.

The invention claimed is:

1. A network card communication method for an artificial intelligence (AI) training platform, comprising:
building a switch network topology on a basis of a spine-leaf network, and configuring a preset number of virtual local area networks for each leaf switch in the switch network topology;
virtualizing a physical network card to obtain a plurality of virtual network cards, allocating the virtual network cards to corresponding job-containers according to a preset allocation rule, and allocating, to each virtual network card in the job-containers, different sub-networks corresponding to the virtual local area networks; and
adding a corresponding sub-network communication policy routing rule to a pod where each job-container is located, whereby a virtual network card in the job-container sends training data to remaining virtual network cards on a basis of the sub-network communication policy routing rule.

2. The network card communication method for the AI training platform according to claim 1, further comprising:
determining a preset convergence ratio for the leaf switch, determining a quantity of spine switches on a basis of the preset convergence ratio, and establishing a connection between each leaf switch and each spine switch and a connection between each leaf switch and each virtual network card respectively.

3. The network card communication method for the AI training platform according to claim 1, wherein the adding a corresponding sub-network communication policy routing rule to a pod where each job-container is located, whereby a virtual network card in the job-container sends training data to the remaining virtual network cards on a basis of the sub-network communication policy routing rule comprises:
obtaining pre-created sub-network communication policy routing rules corresponding to different pods; and
adding the corresponding sub-network communication policy routing rule to the pod where each job-container is located, whereby a source Internet Protocol (IP) address and a destination IP address of training data are obtained on the basis of the sub-network communication policy routing rule, sending the training data to a destination sub-network gateway corresponding to the source IP address through the virtual network card corresponding to the source IP address, and sending the training data to the virtual network card corresponding to the destination IP address through the destination sub-network gateway.

4. The network card communication method for the AI training platform according to claim 3, wherein before obtaining pre-created sub-network communication policy routing rules corresponding to different pods, the method further comprises:
building pods on a basis of the job-containers, init-containers, and pause-containers; and,
wherein the adding the corresponding sub-network communication policy routing rule to the pod where each job-container is located comprises:
adding the corresponding sub-network communication policy routing rule to the init-container in each pod.

5. The network card communication method for the AI training platform according to claim 4, wherein after adding the corresponding sub-network communication policy routing rule to the init-container in each pod, the method further comprises:
determining a sub-network gateway pre-allocated to the virtual network cards corresponding to each pod; and
sending a ping command to the sub-network gateway through each pod, and sending, on a basis of the ping command, an address resolution protocol request comprising a physical address of the pod to the corresponding leaf switch, whereby the leaf switch obtains an IP address of the pod, and the spine switch learns the IP address from the leaf switch on a basis of a border gateway protocol.

6. The network card communication method for the AI training platform according to claim 5, wherein the allocating the virtual network cards to corresponding job-containers according to a preset allocation rule, and allocating, to each virtual network card in the job-containers, different sub-networks corresponding to the virtual local area networks comprises:
- allocating the virtual network cards to the corresponding job-containers on a basis of an IP address management component, and
- allocating, to each virtual network card in the job-containers, different sub-network IP addresses and corresponding sub-network gateways corresponding to the virtual local area networks on the basis of the IP address management component.

7. The network card communication method for the AI training platform according to claim 1, further comprising:
- in response to adding a preset number of leaf switches in the switch network topology, adding sub-network communication policy routing rules corresponding to the preset number of leaf switches to existing pods, creating new pods corresponding to the preset number of leaf switches, and then adding the corresponding sub-network communication policy routing rules to the new pods.

8. An electronic device, comprising:
a memory storing computer-readable instructions; and
one or more processors configured to execute the computer-readable instructions wherein the one or more processors, upon execution of the computer-readable instructions, is configured to:
- build a switch network topology on a basis of a spine-leaf network, and configure a preset number of virtual local area networks for each leaf switch in the switch network topology;
- virtualize a physical network card to obtain a plurality of virtual network cards, allocate the virtual network cards to corresponding job-containers according to a preset allocation rule, and allocate, to each virtual network card in the job-containers, different sub-networks corresponding to the virtual local area networks; and
- add a corresponding sub-network communication policy routing rule to a pod where each job-container is located, whereby a virtual network card in the job-container sends training data to remaining virtual network cards on a basis of the sub-network communication policy routing rule.

9. A non-transitory computer-readable storage medium, storing computer-readable instructions executed by one or more processors and upon execution by the one or more processors, are configured to cause the one or more processors to:
- build a switch network topology on a basis of a spine-leaf network, and configure a preset number of virtual local area networks for each leaf switch in the switch network topology;
- virtualize a physical network card to obtain a plurality of virtual network cards, allocate the virtual network cards to corresponding job-containers according to a preset allocation rule, and allocate, to each virtual network card in the job-containers, different sub-networks corresponding to the virtual local area networks; and
- add a corresponding sub-network communication policy routing rule to a pod where each job-container is located, whereby a virtual network card in the job-container sends training data to remaining virtual network cards on a basis of the sub-network communication policy routing rule.

10. The network card communication method for the AI training platform according to claim 1, wherein the virtualizing a physical network card to obtain a plurality of virtual network cards comprises:
- virtualizing the physical network card on a basis of Single Root Input/Output Virtualization (SRIOV) technology to obtain a plurality of virtual network cards.

11. The network card communication method for the AI training platform according to claim 10, wherein after the virtualizing a physical network card to obtain a plurality of virtual network cards, further comprising:
- obtaining information of the plurality of virtual network cards;
- reporting the information to an arrangement project, wherein the arrangement project is configured to manage the AI training platform.

12. The network card communication method for the AI training platform according to claim 2, wherein the preset convergence ratio refers to a ratio of downlink traffic to uplink traffic of the leaf switch.

13. The network card communication method for the AI training platform according to claim 12, wherein the preset convergence ratio for the leaf switch is configured to be 1:1.

14. The network card communication method for the AI training platform according to claim 1, wherein the network card supports a Remote Direct Memory Access (RDMA) over Converged Ethernet, protocol.

15. The network card communication method for the AI training platform according to claim 14, wherein the network card implements RDMA communication on a basis of User Datagram Protocol.

16. The network card communication method for the AI training platform according to claim 6, wherein the sub-network IP addresses are idle and unused.

17. The network card communication method for the AI training platform according to claim 4, wherein the pause container is configured to prepare network space and storage space for all containers.

18. The network card communication method for the AI training platform according to claim 5, wherein after the sending, on a basis of the ping command, an address resolution protocol request comprising a physical address of the pod to the corresponding leaf switch, further comprising:
- the pod sleeps for a period of time for the corresponding switch to learn routing.

19. The network card communication method for the AI training platform according to claim 1, further comprising:
- in response to adding a plurality of leaf switches in the switch network topology, refreshing policy routes for all containers in the switch network topology.

20. The network card communication method for the AI training platform according to claim 2, wherein the adding a corresponding sub-network communication policy routing rule to a pod where each job-container is located, whereby a virtual network card in the job-container sends training data to the remaining virtual network cards on a basis of the sub-network communication policy routing rule comprises:
- obtaining pre-created sub-network communication policy routing rules corresponding to different pods; and
- adding the corresponding sub-network communication policy routing rule to the pod where each job-container is located, whereby a source Internet Protocol (IP) address and a destination IP address of training data are obtained on the basis of the sub-network communication policy routing rule, sending the training data to a destination sub-network gateway corresponding to the source IP address through the virtual network card corresponding to the source IP address, and sending the training data to the virtual network card corresponding to the destination IP address through the destination sub-network gateway.

* * * * *